(12) United States Patent
Turner, Jr.

(10) Patent No.: US 11,185,792 B2
(45) Date of Patent: Nov. 30, 2021

(54) SYSTEM, AND ASSOCIATED METHOD, FOR RECOVERING WATER FROM AIR

(71) Applicant: J. Glenn Turner, Jr., Dallas, TX (US)

(72) Inventor: J. Glenn Turner, Jr., Dallas, TX (US)

( * ) Notice: Subject to any disclaimer, the term of this patent is extended or adjusted under 35 U.S.C. 154(b) by 0 days.

(21) Appl. No.: 16/836,685

(22) Filed: Mar. 31, 2020

(65) Prior Publication Data
US 2020/0269153 A1    Aug. 27, 2020

Related U.S. Application Data

(60) Continuation-in-part of application No. 16/038,060, filed on Jul. 17, 2018, now Pat. No. 10,603,603, which is a division of application No. 15/452,703, filed on Mar. 7, 2017, now Pat. No. 10,022,649, (Continued)

(51) Int. Cl.
| | |
|---|---|
| *B01D 5/00* | (2006.01) |
| *E03B 3/28* | (2006.01) |
| *F25B 21/02* | (2006.01) |
| *F24F 3/14* | (2006.01) |

(52) U.S. Cl.
CPC .......... *B01D 5/0042* (2013.01); *B01D 5/009* (2013.01); *B01D 5/0015* (2013.01); *E03B 3/28* (2013.01); *F25B 21/02* (2013.01); *F24F 3/1405* (2013.01); *F25B 2321/0251* (2013.01); *Y02A 20/00* (2018.01)

(58) Field of Classification Search
CPC .. B01D 5/0015; B01D 5/0042; B01D 1/0035; B01D 5/009; E03B 3/28; F25B 21/02; F25B 2321/0251; F24F 3/1405; F24F 3/153; Y02A 20/00; C02F 1/18
See application file for complete search history.

(56) References Cited

U.S. PATENT DOCUMENTS

| | | |
|---|---|---|
| 3,126,710 A | 3/1964 | Boehmer et al. |
| 3,400,516 A | 9/1968 | De Leon |
| 3,789,582 A | 2/1974 | Graybill |
| (Continued) | | |

OTHER PUBLICATIONS

Atta, Raghied Mohammed, Solar Water Condensation Using Thermoelectric Coolers, Abstract, Int'l Journal of Water Resources and Arid Environments 1(2), pp. 142-145, ISSN 2079-7079, 2011.
(Continued)

*Primary Examiner* — Frantz F Jules
*Assistant Examiner* — Martha Tadesse
(74) *Attorney, Agent, or Firm* — Jack D. Stone, Jr.; Scheef & Stone, L.L.P.

(57) ABSTRACT

A system for recovering water from air includes a skirt supported by legs and at least one interior wall suspended from the skirt. At least one exterior wall extends from an accumulator and is spaced apart from and substantially parallel to the at least one interior wall, thereby defining a flow channel between the at least one interior wall and the at least one exterior wall. At least one thermoelectric cooler (TEC) is connectable to an electrical power source for transferring heat from a cool side of the TEC to a warm side of the TEC, the cool side being positioned on the at least one interior wall, not in the flow channel, for cooling the at least one interior wall, the at least one interior wall defining a condensing surface proximate the at least one TEC.

12 Claims, 8 Drawing Sheets

Related U.S. Application Data which is a division of application No. 14/949,808, filed on Nov. 23, 2015, now Pat. No. 9,587,381.

(60) Provisional application No. 62/083,168, filed on Nov. 22, 2014.

(56) References Cited

U.S. PATENT DOCUMENTS

| | | | |
|---|---|---|---|
| 4,127,103 A | 11/1978 | Klank et al. | |
| 4,184,338 A | 1/1980 | Bennett | |
| 4,290,273 A | 9/1981 | Meckler | |
| 4,351,161 A | 9/1982 | Jones | |
| 4,429,545 A | 2/1984 | Steinberg | |
| 4,437,456 A | 3/1984 | Merrigan | |
| 4,467,788 A | 8/1984 | Peranio | |
| 4,487,659 A | 12/1984 | Stark | |
| 5,517,829 A | 5/1996 | Michael | |
| 5,601,236 A | 2/1997 | Wold | |
| 5,729,981 A | 3/1998 | Markus et al. | |
| 5,846,296 A * | 12/1998 | Krumsvik | E03B 3/28 95/115 |
| 6,116,034 A | 9/2000 | Alexeev et al. | |
| 6,367,261 B1 | 4/2002 | Marshall et al. | |
| 6,574,979 B2 * | 6/2003 | Faqih | B01D 5/0033 62/285 |
| 6,684,648 B2 | 2/2004 | Faqih | |
| 6,945,063 B2 | 9/2005 | Max | |
| 7,337,615 B2 | 3/2008 | Reidy | |
| 7,467,523 B2 | 12/2008 | Vetrovec et al. | |
| 7,478,535 B2 | 1/2009 | Turner, Jr. | |
| 7,887,622 B1 | 2/2011 | Turner, Jr. | |
| 9,132,382 B2 | 9/2015 | Goelet | |
| 9,587,381 B2 | 3/2017 | Turner, Jr. | |
| 10,022,649 B2 | 7/2018 | Turner, Jr. | |
| 10,603,603 B2 | 3/2020 | Turner, Jr. | |
| 2002/0046569 A1 | 4/2002 | Faqih | |
| 2003/0159457 A1 | 8/2003 | Faqih | |
| 2004/0060808 A1 | 4/2004 | LaViolette | |
| 2005/0044862 A1 | 3/2005 | Vetrovec | |
| 2006/0279167 A1 * | 12/2006 | Turner, Jr. | E03B 3/28 310/307 |
| 2006/0288709 A1 * | 12/2006 | Reidy | F25B 21/02 62/3.4 |
| 2009/0293724 A1 | 12/2009 | Ivison | |
| 2012/0037343 A1 | 2/2012 | Mielke et al. | |

OTHER PUBLICATIONS

Nandy, Aditya et al., A Project on Atmospheric Water Generator with the Concept of Peltier Effect, Abstract, Int'l Journal of Advanced Computer Research; vol. 4, No. 2, Issue 15, pp. 481-486, ISSN 2249-7277, Jun. 2014.

* cited by examiner

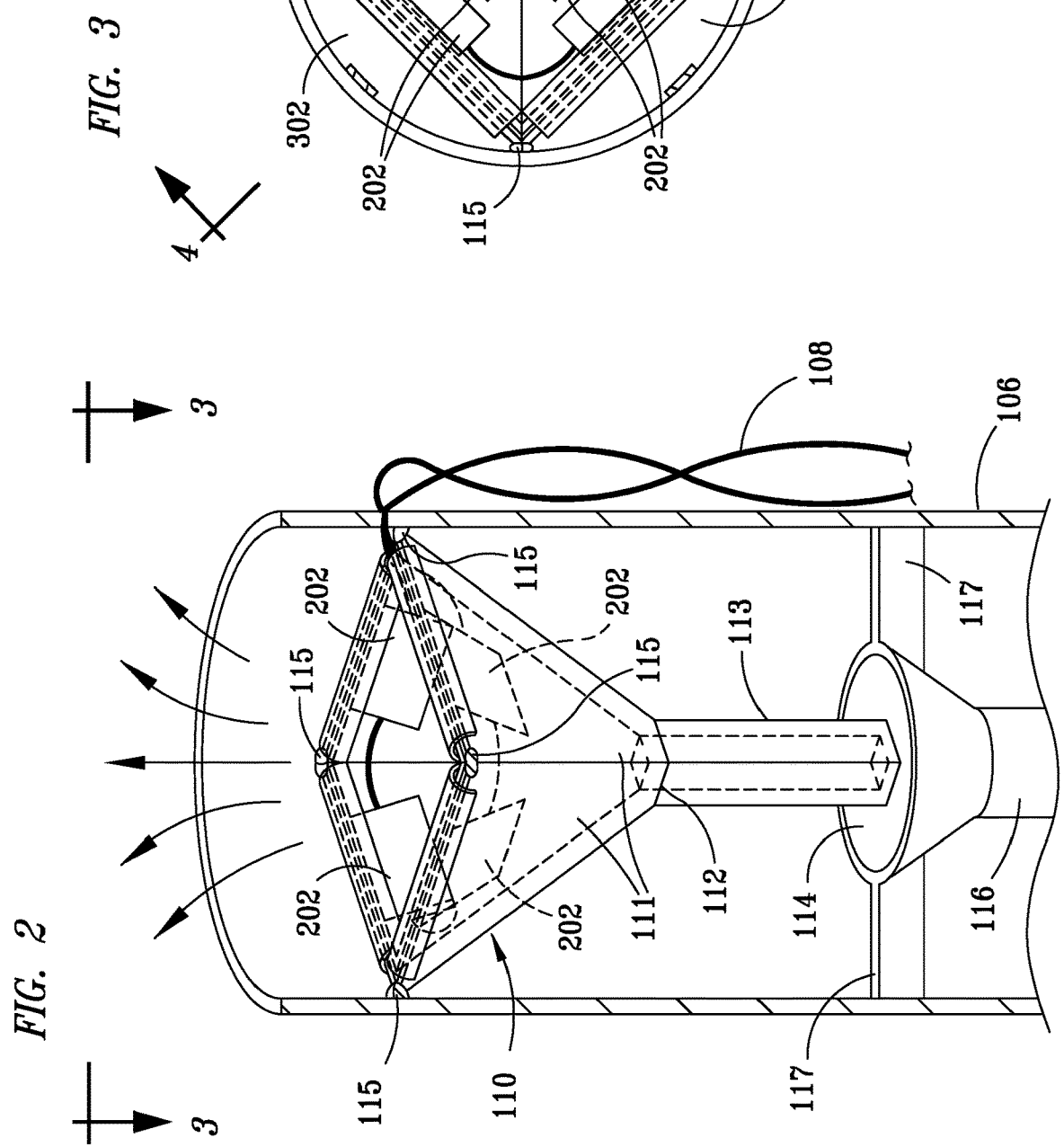

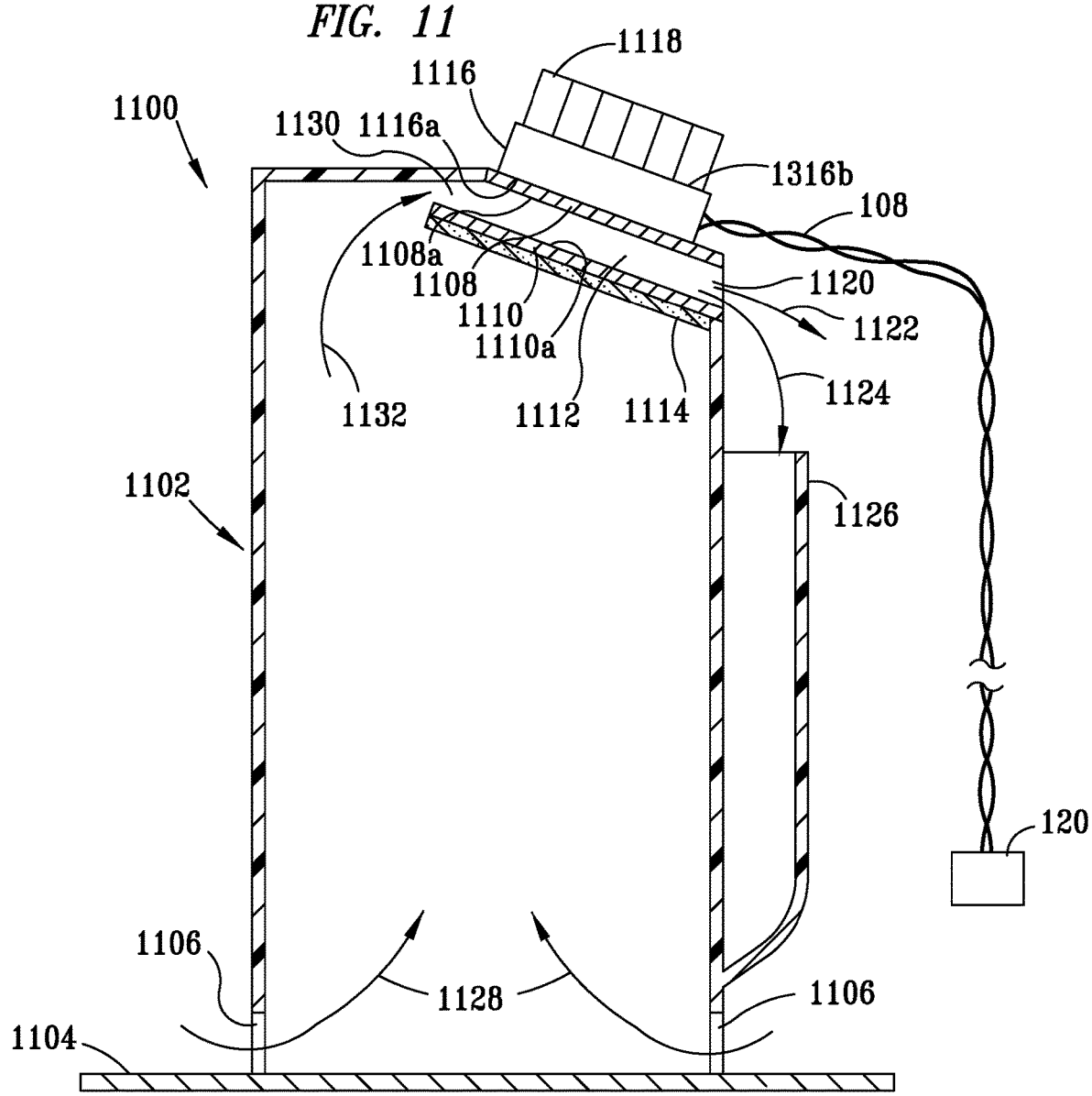

SYSTEM, AND ASSOCIATED METHOD, FOR RECOVERING WATER FROM AIR

CROSS-REFERENCE TO RELATED APPLICATIONS

This application is a continuation-in-part patent application of U.S. Pat. No. 10,603,603, formerly co-pending application Ser. No. 16/038,060, filed on Jul. 17, 2018, and issued on Mar. 31, 2020, which is a divisional patent application of U.S. Pat. No. 10,022,649, formerly co-pending application Ser. No. 15/452,703, filed on Mar. 7, 2017, and issued on Jul. 17, 2018, which is a divisional patent application of U.S. Pat. No. 9,587,381, formerly co-pending application Ser. No. 14/949,808, filed on Nov. 23, 2015, and issued on Mar. 7, 2017, which claims the benefit of U.S. Provisional Application No. 62/083,168, filed Nov. 22, 2014, all of which patents and applications are hereby incorporated herein by reference, in their entirety.

TECHNICAL FIELD

The invention relates generally to recovering water from air, and, more particularly, to condensing and collecting water that has been absorbed into air, also known as the atmosphere.

BACKGROUND

The supply of water, and clean water in particular, has progressively become a serious problem in many parts of the world. The ground water level sinks, severe droughts occur, landscapes dry up, and deserts spread. The water which exists in these areas is generally very highly polluted, which in turn can lead to disease among both people and animals, with infections, which can result in major disasters.

Many attempts have been made to supply such problem areas with water in some form or other, either by drilling to great depths in the soil to create water wells and recover water from under the ground, or by damming up and channeling as needed water on the surface of the ground. However, there are regions in which water may not be recovered from under the ground via wells, and no water is available on the surface of the ground that may be dammed and channeled, and such techniques are therefore not available.

Where sea water is available, plants have been developed for purifying such water in order to provide drinking water. However, sea water is not always available, or is only available via extensive pipeline systems, and such plants are generally prohibitively expensive to build, and require substantial energy to operate.

Where water is not available either under the ground or on the surface of the ground, and sea water is not readily available, attempts have been made to recover moisture from the atmosphere, that is, by recovering water which exists in humid air. Techniques which have heretofore been developed for recovering water from air require complex equipment, such as evaporators, condensers, large fans to force air through a system, and/or the like, and substantial space for such equipment, as well as substantial energy to operate such equipment.

Accordingly, a continuing search has been directed to the development of systems and methods which can recover water from the atmosphere, which systems and methods do not require complex equipment and substantial amounts of space and energy to operate.

SUMMARY

The present invention, accordingly, provides a system for recovering water from air. The system includes a skirt supported by legs and at least one interior wall suspended from the skirt. At least one exterior wall extends from an accumulator and is spaced apart from and substantially parallel to the at least one interior wall, thereby defining a flow channel between the at least one interior wall and the at least one exterior wall. At least one thermoelectric cooler (TEC) is connectable to an electrical power source for transferring heat from a cool side of the TEC to a warm side of the TEC, the cool side being positioned on the at least one interior wall, not in the flow channel, for cooling the at least one interior wall, the at least one interior wall defining a condensing surface proximate the at least one TEC.

In the operation of the invention, the skirt is heated from sunlight, and heat is transferred from the skirt to air inside the skirt, causing the air to rise into, and flow through, the flow channel. Water in the air condenses on the condensing surface, drips from the condensing surface, and flows through the channel into the accumulator for access by a user.

In an alternate embodiment, the system includes a funnel having a non-reflective surface oriented for receiving and absorbing heat energy from the sun, and an upwardly-oriented vertex end defining a vertex opening, and a downwardly-oriented base end defining a base opening larger than the vertex opening. The funnel is preferably supported on legs positioned proximate to the base opening of the lower funnel. An upwardly extending column having a relatively non-reflecting exterior surface is attached to the vertex opening for facilitating fluid communication by convection from the funnel to the column. A condensing surface is secured within a channel defined within the interior of the column, and at least one thermoelectric cooler or continuous absorption cooler operable by the application heat furnished by gas is positioned on the condensing surface for cooling the condensing surface. A collector is positioned within the column for catching water that condenses on, and drips from, the condensing surface, and flows through the channel. The collector is connected in fluid communication with an accumulator for receiving and accumulating condensate received by the collector.

In operation, the funnel is heated from sunlight, and heat is transferred from the funnel to air inside the funnel, causing the air to rise into, and flow through, the column. Water in the air condenses on the condensing surface, drips from the condensing surface, flows through the channel, is caught by the collector, and accumulated in the accumulator for access by a user.

In a further alternate embodiment of the invention, a system for recovering water from air includes a base plate having an upper surface having a substantially non-reflective surface to absorb heat energy from the sun. A column is positioned on the base plate and has at least one wall through which heat energy from the sun may pass to the base plate to heat the base plate, and the base plate heats air in the column. An upper thermally conductive plate is secured at an angle between horizontal and vertical within an upper end of the column. A lower plate is secured within the column parallel to and spaced beneath the upper plate to define a flow channel between the upper plate and the lower plate. A thermoelectric cooler is connectable to a power source for cooling the upper plate. An accumulator is positioned for collecting and accumulating water that condenses on and flows through the flow channel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 exemplifies a partially cut-away perspective view of an interior of a condenser adapted for use in the system of FIG. 1;

FIG. 3 presents a plan view of the condenser of FIG. 2 taken along the line 3-3 of FIG. 2;

DETAILED DESCRIPTION

Figure 1:
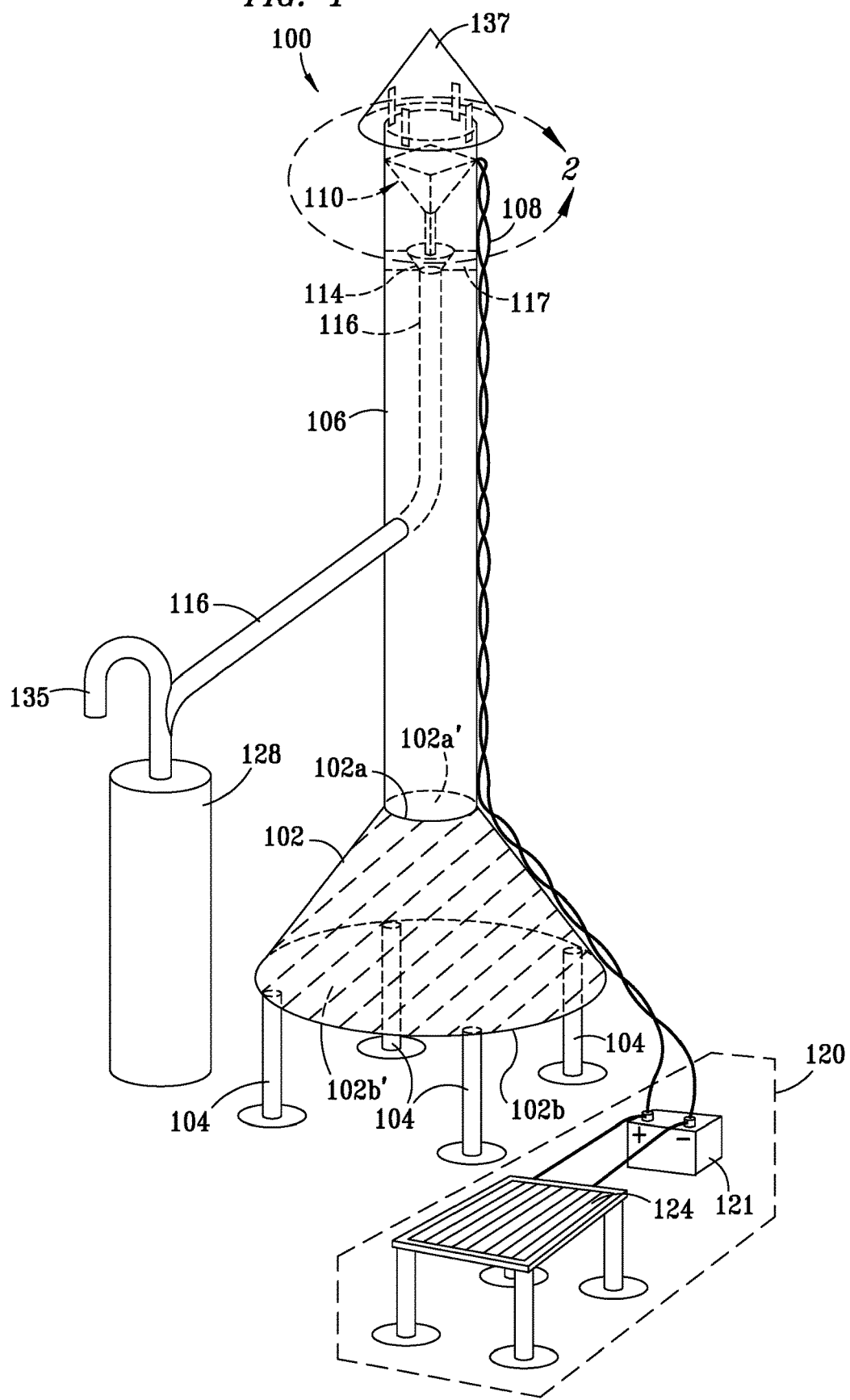
FIG. 1 exemplifies a perspective view of a water recovery system embodying features of the present invention.

In the following discussion, numerous specific details are set forth to provide a thorough understanding of the present invention. However, it will be obvious to those skilled in the art that the present invention may be practiced without such specific details. Additionally, for the most part, details concerning thermoelectric coolers, continuous absorption coolers, solar panels, and the like, have been omitted inasmuch as such details are not considered necessary to obtain a complete understanding of the present invention, and are considered to be within the skills of persons of ordinary skill in the relevant art.

Refer now to the drawings wherein depicted elements are, for the sake of clarity, not necessarily shown to scale and wherein like or similar elements are designated by the same reference numeral through the several views.

In FIG. 1 of the drawings, the reference numeral 100 generally designates a water recovery system embodying features of the present invention. System 100 preferably includes a frusto-conical skirt or funnel 102, preferably supported on four legs 104, though any number of legs may be utilized in support of the funnel, or legs may be omitted and openings formed in the funnel 102 to permit the inflow of air. Funnel 102 is preferably fabricated from a sheet of thermally conductive material, such as sheet metal, and includes a vertex 109, or upper, end 102a defining a vertex, or upper, opening 102a', and a base, or lower, end 102b defining a base, or lower, opening 102b' larger than the vertex opening 102a'. The exterior surface of funnel 102, and optionally, the interior surface as well, are preferably substantially non-reflective heat-absorbing surfaces, such as, for example, black surfaces, or other dark colored substantially non-reflective heat-absorbing surfaces.

A column 106 is mounted over upper opening 102a' of funnel 102. Column 106 is preferably fabricated from sheet metal, having a cross-section which is preferably circular, and includes an exterior surface, and optionally, an interior surface as well, which is substantially reflective, being, for example, metallic, white, or other substantially light-reflective color. Alternatively, depending on air temperature and humidity and exposure to sunlight, it may be advantageous for facilitating convection for all or a portion of the exterior surface, and optionally, interior surface as well, of the column 106 to be substantially non-reflective, being, for example, black, or other substantially dark color, or some grade of reflectivity that is partially reflective and non-reflective. While the cross-section of column 106 is exemplified as being circular, it may alternatively be any of a number of different shapes, such as square, triangular, or the like. A cover 137 is preferably positioned atop column 106 for preventing debris in the air from falling into the condenser and accumulator.

A condenser 110 is positioned within an upper portion of column 106, and, as shown and described in greater detail below with respect to FIGS. 2-4, preferably comprises four substantially flat interior sides, or walls, 111 configured to form a funnel in the shape of an inverted pyramid. Alternatively, condenser 110 may be configured in any of a number of different ways, and may, by way of example, have more or less than four walls, or assume alternative configurations, such as a conical shape, as discussed below. Walls 111 are preferably fabricated from a thermally conductive material, such as sheet metal. A channel 126 extends downwardly from an opening formed at vertex 109 of condenser 110, and fluid communication is thereby established between the interior of condenser 110 and the interior of channel 126. Four exterior walls 112 and 113 are formed outside of respective interior walls 111 and 125, the interior and exterior walls being substantially parallel to each other. A flow channel 118 is defined between interior walls 111 and exterior walls 112, and a channel 126 is defined between interior walls 125 and exterior walls 113. An upper end of interior walls 111 is formed into an arcuate shape 119 which extends over exterior walls 112 and is open for capturing air currents that flow upwardly through column 106, as discussed further below. Walls 112, 113, and 125 are preferably fabricated from material, such as plastic, that is relatively ineffective for conducting heat. The exterior surfaces of exterior walls 112 and 113 are preferably insulated with insulation 127. Similarly, the interior surfaces of interior walls 125 are preferably insulated with insulation 122. As shown most clearly in FIG. 3, condenser 110 is preferably secured in column 106 by tack welding each of four corners 115 of condenser 110 to the interior wall of column 106. Alternatively, condenser 110 may be secured in column 106 using any other conventional means, such as support arms or braces extending between condenser 110 and column 106, similar to support arms or braces 117 extending between a collector 114 (discussed below) and column 106, described below with respect to FIGS. 2 and 4.

Collector 114 is preferably positioned within column 106 under condenser 110 for receiving water that drips from vertex 109 and walls 113. Collector 114 is preferably conically-shaped, and is supported therein using any conventional means, such as a plurality of metal arms or braces 117 extending between collector 114 and column 106, or (not shown) between collector 114 and walls 113. In an alternative embodiment, collector 114 is joined to walls 113 to form a substantially air-tight seal between collector 114 and walls 113 and to provide additional support for condenser 110.

A conduit 116, such as a tube or hose, is preferably connected in fluid communication between collector 114 and an accumulator 128, such as a drum, and extends through the wall of column 106, for facilitating the flow of water from collector 114 to accumulator 128. A vent 135 may optionally be provided on the conduit 116. In an alternative embodiment of the invention, conduit 116 is connected directly to walls 113 to form a substantially air-tight seal between walls 113 and conduit 116, and to provide additional support for condenser 110, rendering collector 114 unnecessary.

Accumulator 128 is configured for accumulating and storing water captured by collector 114, and, but for conduit 116, is preferably closed and sealed at the top, though it may alternatively be open-topped. While not shown, accumulator 128 preferably also includes means, such as a valve positioned in a lower portion of accumulator 128, for enabling a user to conveniently draw water from the accumulator in a manner well-known in the art. Accumulator 128 is preferably positioned laterally and externally of funnel 102, but may alternatively be centrally positioned directly under funnel 102 and condenser 110, with conduit 116 running straight downwardly from collector 114 to accumulator 128.

System 100 further includes an electrical power source 120, preferably comprising one or more batteries 121 and solar panels 124, which are preferably configured in a conventional manner for working together so that power may be supplied from the battery when there is little or no sunshine to energize the solar panels. Electrical power source 120 is connected via wires 108 for supplying electrical power to the certain components of condenser 110, described further below. Electrical power source 120 is preferably self-contained, needing no external power supply, though external electrical power may optionally be made available through conventional power sources, as needed, should electrical power source 120 be unable to supply the quantity of power needed by condenser 110.

At least one Peltier Junction Module, or thermoelectric cooler (TEC), 202 is preferably positioned on an interior surface of each interior wall 111 so that, when energized, the TECs absorb heat from, and thereby cool, the walls 111 of condenser 110. TECs 202 are electrically coupled via wires 108 to power source 120, and may be interconnected in any conventional manner, such as by a parallel or serial circuit. While not shown, TECs 202 are preferably provided with heat sinks on a side opposing walls 111 for dissipating heat absorbed by the TECs. TECs, such as described herein, are considered to be well-known in the art and, therefore, will not be described in further detail herein, except insofar as necessary to describe the invention. Alternatively, any suitable method for cooling interior walls 111 may be used, such as, by way of example, a continuous absorption type of cooling unit operated by the application of a limited amount of heat furnished by gas.

FIG. 3 depicts a plan view of condenser 110 within column 106. As exemplified most clearly therein, TECs 202 are preferably serially connected to wires 108, though they may alternatively be connected in parallel. Also shown in FIG. 3 are spaces 302 between column 106 and condenser 110, to thereby facilitate the upward flow of air through column 106 and past condenser 110, for reasons discussed in further detail below.

In operation, system 100 is preferably positioned so that funnel 102 is exposed to the heat of sunlight which is absorbed by, and thereby heats, the dark or black surface of funnel 102. Heat from the surface of funnel 102 heats air inside funnel 102, causing the air to convectively rise up in funnel 102 through vertex opening 102a', and into column 106, as indicated by arrows 107. The air is then captured by arcuate bends 119 and directed through channels 118 and 126. Electrical power is applied to the TECs 202 to cause them thereby to cool walls 111 of condenser 110. As heated air passes through channel 118 and over cooled walls 111, water in the air condenses onto surfaces of channel 118. The condensed water then flows, from the force of gravity, downwardly through channels 118 and 126, and into collector 114. Water caught by collector 114 then flows, as indicated by an arrow 130, through conduit 116 to accumulator 128, where it is made available for use by a user (not shown) in a conventional manner.

As air in channel 118 is cooled, it flows downwardly through the channels 118 and 126, as indicated by arrows 107. The downward flow of air in channels 118 and 126 creates a pressure drop at the top of channel 118 which draws new warmer air in funnel 102 into channel 118, thereby maintaining a flow of air from funnel 102 through channels 118 and 126. As the TECs 202 heat the air in cavity 134, the air rises, creating a pressure drop at the bottom of channel 126, which draws cooled air from channel 126 upwardly, as indicated by arrows 132, into cavity 134. It may be appreciated that a continual flow of air is maintained from funnel 102, downwardly into channels 118 and 126, upwardly into cavity 134 and back into the atmosphere.

Figure 4:
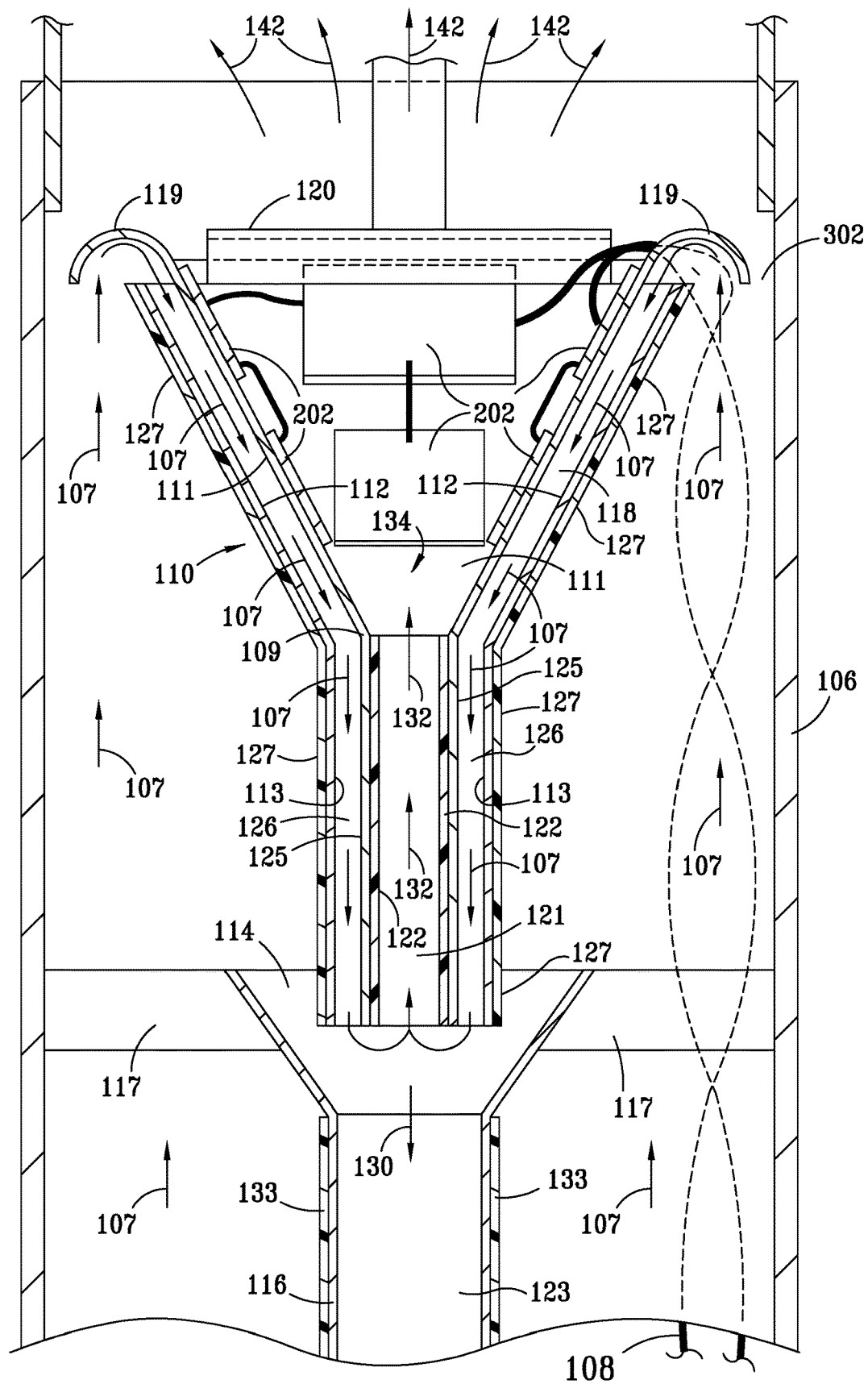
FIG. 4 presents a cross-sectional view of the condenser of FIG. 2 taken along the line 4-4 of FIG. 3.
Figure 5:
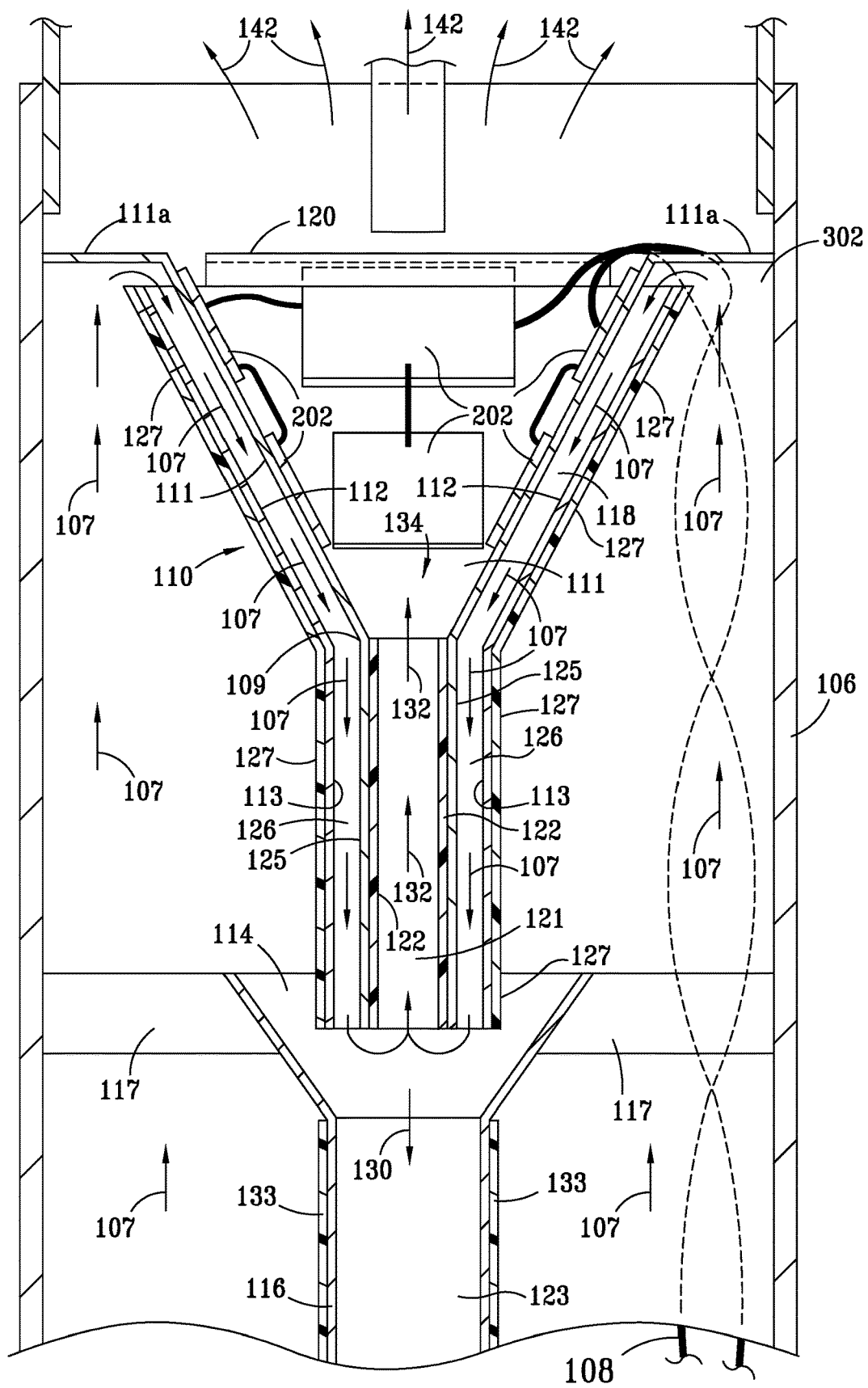
FIG. 5 exemplifies an alternative embodiment of the invention of FIG. 4 wherein the column is sealed so as to force all upward-flowing air through the condenser.

FIG. 5 exemplifies an alternative embodiment of the invention of FIG. 4 wherein the column is sealed by a wall 111 substantially flat horizontal extension so as to force all upward-flowing air through condenser 100 as indicated by arrows 107. Operation of the embodiment of FIG. 5 is otherwise similar to the operation of the embodiment of FIGS. 1-4.

Figure 6:
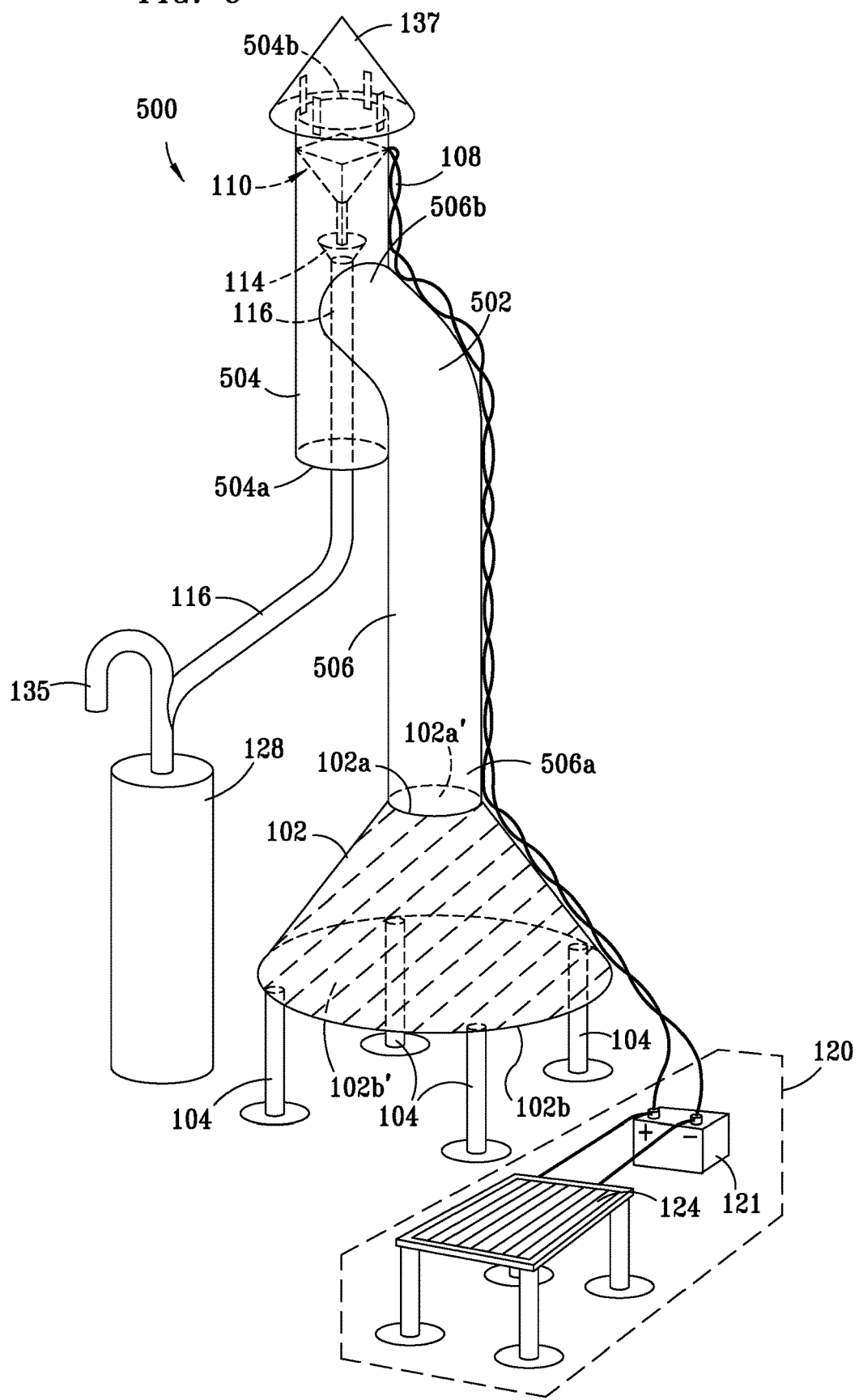
FIG. 6 exemplifies an alternative embodiment of the water recovery system of FIG. 1 embodying features of the present invention.

FIG. 6 depicts the details of a water recovery system 500 according to an alternate embodiment of the present invention. Since water recovery system 500 contains many components that are substantially identical to those of the previous embodiment 100, such components are referred to by the same reference numerals and will not be described in any further detail. According to the embodiment of FIG. 5, column 106 is replaced by a primary column 506 having a bend 502 formed between a lower portion 506a and an upper portion 506b of column 506. Lower portion 506a of column 506 is connected in fluid communication to funnel 102, and upper portion 506b of column 506 is connected in fluid communication to a central portion of an auxiliary column 504. Auxiliary column 504 is preferably a substantially straight, vertically extending column which defines an open lower end 504a and an open upper end 504b. Condenser 110 and collector 114 are positioned within auxiliary column 504 between the open upper end 504b of auxiliary column 504 and the connection of upper portion 506b of column 506 to auxiliary column 504, and are secured thereto similarly as described above with respect to FIGS. 1-5. In further contrast to the water recovery system 100, wherein conduit 116 extends through the wall of column 106, in the water recovery system 500, conduit 116 preferably runs downwardly through the open lower end 504a of auxiliary column 504.

Operation of the water recovery system 500 is similar to the operation of water recovery system 100, the only material difference being that warm humid air passes from primary column 506 to auxiliary column 504 before passing over condenser 110.

Figure 7:
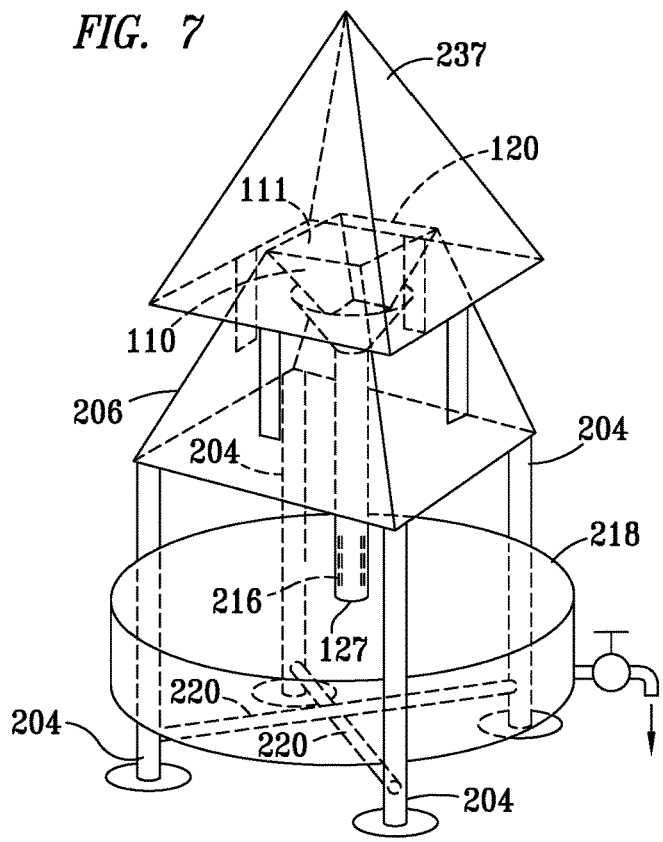
FIG. 7 exemplifies an alternative embodiment of the invention made more compact by forgoing the column and forcing all upward-flowing air through the condenser.
Figure 8:
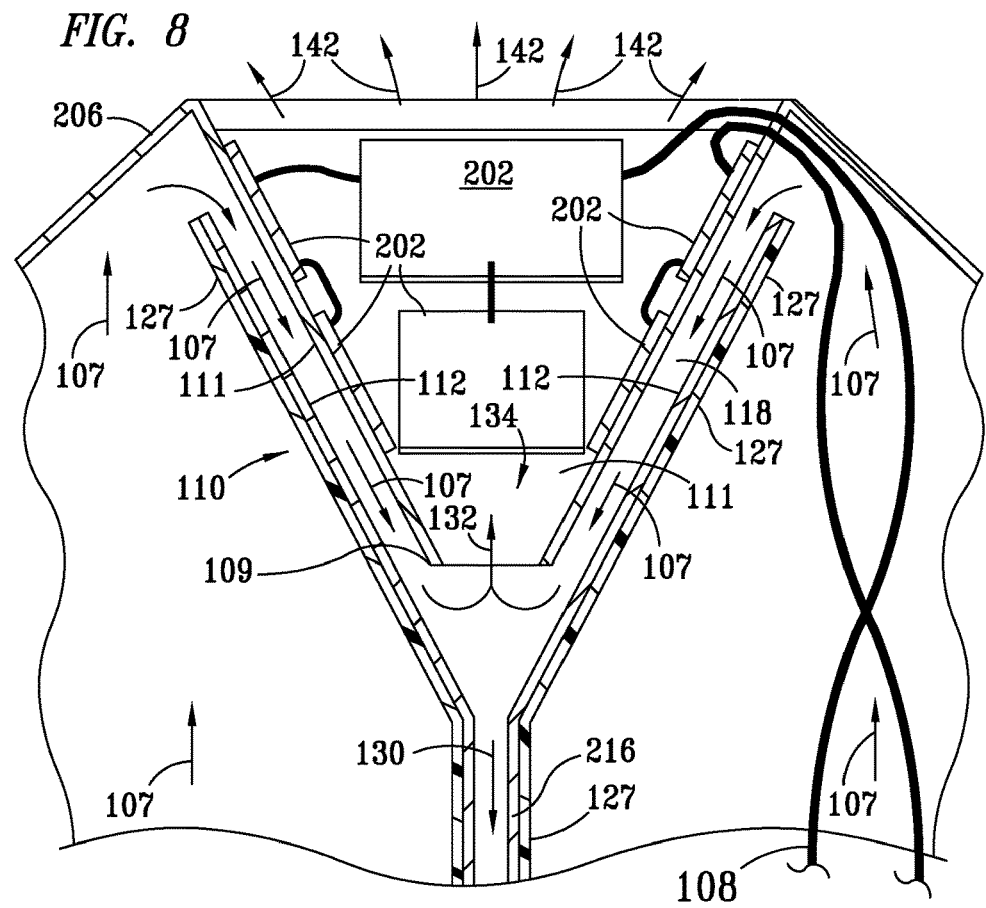
FIG. 8 presents detail of a condenser of the embodiment of FIG. 7.

FIGS. 7 and 8 exemplify an alternative, more streamlined embodiment of the invention. A skirt 206 preferably comprises sheet material in the shape of a four-panel frustum, or alternatively a frusto-conical shape, the sheet material being a heat-absorbing thermally conductive material, such as sheet metal having a black exterior, and supported by legs 204. Skirt 206 is preferably used to perform the functions of funnel 102 and column 106 of heating air and directing the heated air into condenser 110, and are connected directly to the upper edges of interior walls 111. Accumulator 128 is replaced by accumulator 218 which is positioned directly beneath condenser 110. Accumulator 218 is connected via a conduit 216 to exterior walls 112 for collecting condensate condensed on walls 111. A cover 237 is provided for preventing debris in the air from falling into the condenser and accumulator.

In the operation of the embodiment of FIGS. 7 and 8, heat energy from the sun heats skirt 206 which heats air under skirt 206. Warm heated air under skirt 206 rises, enters channel 118, and then passes by wall 111 which is cooled by TECs 202. Water in the air is then condensed out and passes downwardly through channel 118 and conduit 216, as indicated by arrow 130, into accumulator 218. After the water is condensed out, the air flows upwardly as indicated by arrows 132 and 142, returning to the ambient air. The upward flow of air is facilitated by heat absorbed and dissipated by TECs 202.

Figure 9:
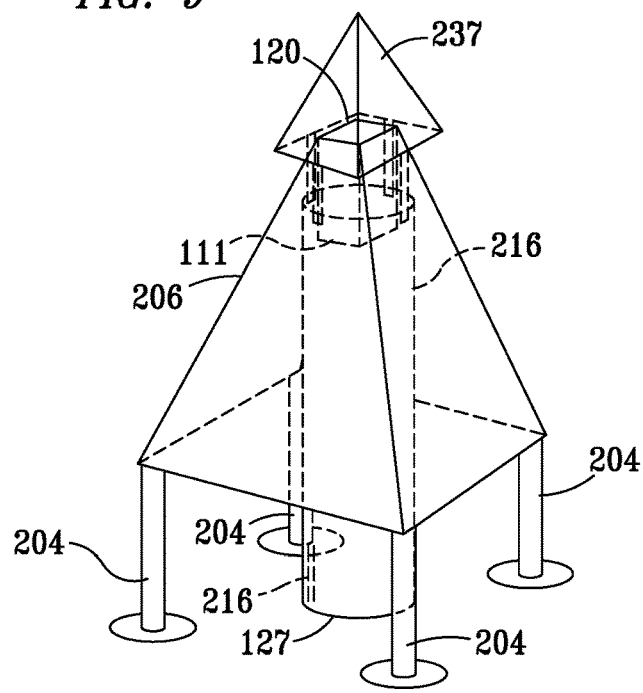
FIG. 9 exemplifies an alternative embodiment of the invention of FIG. 7 wherein the accumulator forms an integral portion of the condenser.
Figure 10:
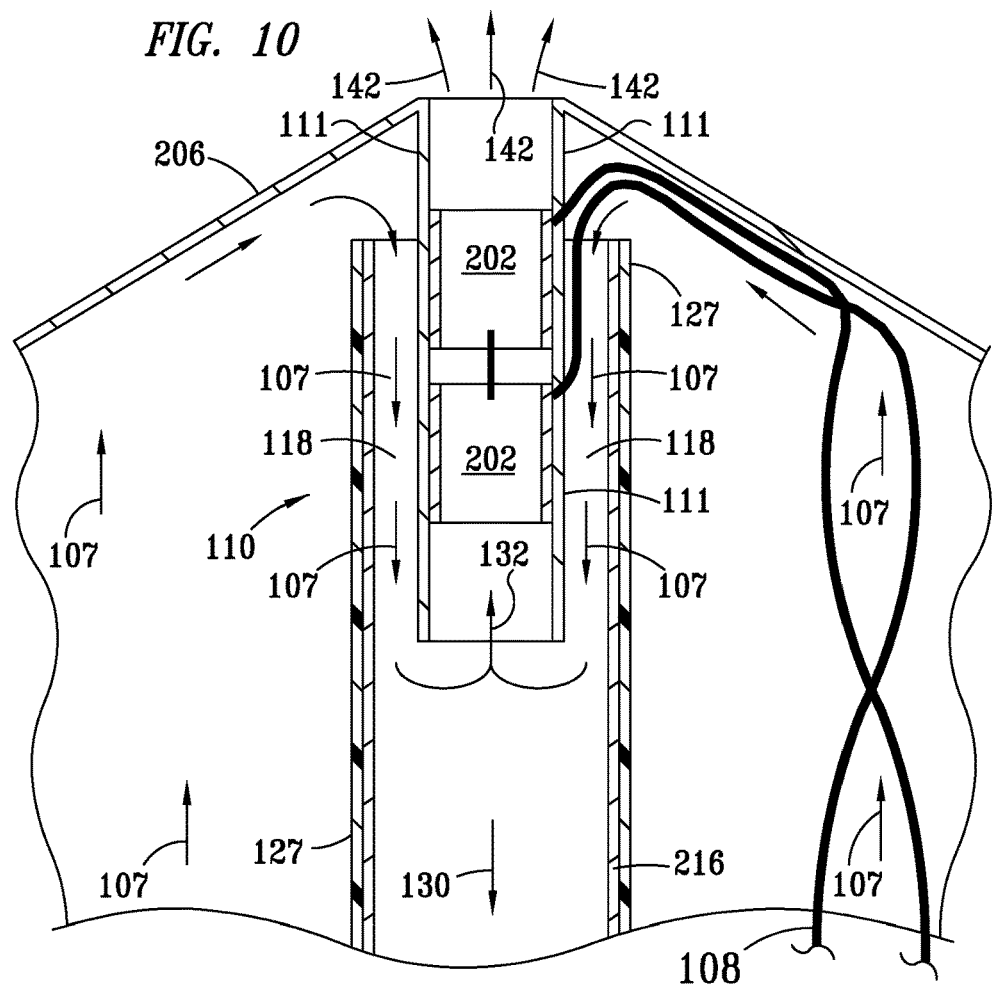
FIG. 10 presents detail of a condenser and accumulator of the embodiment of FIG. 9; and, FIG. 11 exemplifies a water recovery system according to a further alternative embodiment of the present invention.

FIGS. 9 and 10 exemplify an alternative embodiment of the invention of FIGS. 7 and 8, wherein the accumulator 218 forms an integral and streamlined portion of the condenser 110. Interior walls 111 of condenser 110 are preferably substantially vertical, and the walls of accumulator 218 extend upwardly to envelope walls 111. Operation of the embodiment of FIGS. 9 and 10 is similar to the operation of the embodiment of FIGS. 7-8.

FIG. 11 exemplifies a water recovery system 1100 according to a further alternate embodiment of the present invention. Water recovery system 1100 includes a column 1102, preferably comprising a material that allows light to pass through, such as clear plastic. Column 1102 may be defined by any suitable cross-section, such as square or round. Column 1102 is preferably seated on a base plate 1104 having a non-reflective surface and heat-absorbing color, such as black, for absorbing heat energy from the sun, and for heating air within column 1102, thereby causing air in the column to rise upwardly. Openings 1106 are defined in a lower portion of column 1102 for allowing air to enter into column 1102, indicated by arrows 1128, as air in column 1102 rises upwardly.

An upper portion of column 1102 is sealed, but for a condenser passageway 1112 defined by an upper plate 1108 and a lower plate 1110, which plates are arranged at an angle to define an inlet 1130 and an outlet 1120. The plates 1108 and 1110 are preferably fabricated from a thermally conductive material such as copper, and include respective surfaces 1108a and 1110a onto which are preferably formed grooves for facilitating the flow of water droplets passing through passageway 1112. A layer of insulation 1114 is preferably adhered to the bottom side of plate 1110 for preventing the transfer of heat from air in column 1102 to air in passageway 1112, to thereby render the system 1100 more efficient for recovering water from air. An accumulator 1126 is positioned on an exterior surface of column 1102 for collecting water condensed in condenser passageway 1112.

At least one Peltier Junction Module, or thermoelectric cooler (TEC), 1116 is positioned so that a side 1116a of TEC 1116 that is cool in operation is firmly seated against the upper surface of upper plate 1108 to facilitate the transfer of heat from air in passageway 1112 to TEC 1116. A heat sink 1118 is positioned on a side 1116b of TEC 1116 opposite side 1116a for absorbing heat from the TEC and dissipating that heat to the air. While not shown, it is understood that the TEC may be supplied electrical power in any conventional manner, such as by electrical power source 120 via wires 108.

In operation, TEC 1116 is powered on and proceeds to transfer heat from plate 1108 to heat sink 1118, thereby cooling plate 1108. While plate 1108 is cooling, heat energy from the sun passes through the clear walls of column 1102 and heats base plate 1104, which in turn heats air contained within the column until the air is warmed and rises upwardly, as indicated by arrow 1132, toward inlet 1130 of passageway 1112. As the warm air rises, a pressure drop in column 1102 draws more air into the column through openings 1106, as indicated by arrows 1128. As warm air passes through inlet 1130 into passageway 1112, water in the warm air condenses on the cool surface 1108a of plate 1108 and the water droplets either flow down the grooved surface 1108a or fall onto grooved surface 1110a and flow downwardly. As water droplets form on either or both surfaces 1108a and 1110a, they flow downwardly, and are collected in accumulator 1126 for use as desired.

By the use of the present invention, a system and method are disclosed which can recover water from the atmosphere, and which do not require complex equipment and substantial amounts of space and energy to operate.

It is understood that the present invention may take many forms and embodiments. Accordingly, several variations may be made in the foregoing without departing from the spirit or the scope of the invention. For example, column 106 or 506 could operate without funnel 102, or column 106 or 506 could in its entirety constitute a funnel without a cylindrical portion. System 100 may be fabricated without legs 104, and holes may be perforated in funnel 102 to allow for the entry of air therein. Still further, condensers may be modified wherein larger and/or additional TECs 202 are positioned on the interior of walls 111 and arranged thereon (e.g., side-by-side or stacked) and/or shaped to thereby maximize the portion of the surfaces of the walls 111 that are cooled by the TECs. Ducting may be added to the embodiment of FIG. 11 to direct air exiting from outlet 1120 over the heat sink 1118 to facilitate the flow of air and more efficiently operate the system.

In a still further variation of the foregoing, in an alternative to cooling provided by the TECs 202, walls 111 of a respective condenser may be cooled using other cooling and refrigeration technologies, such as natural gas technologies, including (1) a continuous absorption type of cooling unit operated by the application of a limited amount of heat furnished by natural gas (e.g., as developed by Servel, Inc.) (or alternatively, heated by electricity, kerosene, and/or any other suitable fuel), (2) engine driven chillers, (3) desiccant dehumidification systems, (4) heat sinks, and/or the like. It is considered that such alternative cooling technologies are well-known in the art, and that a person skilled in the art, upon a reading of the invention disclosed herein, could implement such technologies and, therefore, will not be discussed in further detail herein.

In a still further variation, corrugated surfaces and fans may be utilized for forced induction of air in any of the embodiments described herein in a manner as would be apparent to a person having ordinary skill in the art upon a reading of this application.

In a still further variation, any of the aforementioned interior walls and exterior walls have superhydrophobic surfaces defining a flow channel between the interior wall and the exterior wall, to facilitate the flow of water through the channel.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for recovering water from air, the system comprising:
   at least three legs;
   a skirt supported by the at least three legs, wherein the skirt defines a lower opening and an upper opening;
   at least one interior wall suspended from the skirt, wherein the at least one interior wall defines a frusto-conical shape;
   an accumulator;
   at least one exterior wall extending from the accumulator and spaced from the at least one interior wall, the at least one interior wall and at least one exterior wall having superhydrophobic surfaces defining a flow channel between the at least one interior wall and the at least one exterior wall; and
   at least one thermoelectric cooler (TEC) connectable to an electrical power source for transferring heat from a cool side of the TEC to a warm side of the TEC, the cool side being positioned on the at least one interior wall, not in the flow channel, for cooling the at least one interior wall, the at least one interior wall defining a condensing surface proximate the at least one TEC.

2. The system of claim 1, further comprising a heat sink positioned on the warm side of the TEC for dissipating heat from the TEC.

3. The system of claim 1, wherein the skirt defines a frustum.

4. The system of claim 1, wherein the skirt defines a frusto-conical shape.

5. The system of claim 1, wherein the skirt comprises a heat-absorbing thermally conductive material.

6. The system of claim 1, wherein the exterior wall includes a layer of insulation positioned on a surface opposite the flow channel.

7. The system of claim 1, wherein the electrical power source includes at least one solar panel configured for converting solar energy to electrical energy effective for operating the at least one thermoelectric cooler.

8. The system of claim 1, wherein the electrical power source includes at least one battery effective for supplying electrical energy to the at least one thermoelectric cooler.

9. The system of claim 1, wherein the electrical power source includes at least one battery and at least one solar panel coupled with the at least one battery, the solar panel being configured for converting solar energy to electrical energy effective for operating the at least one thermoelectric cooler.

10. The system of claim 1, wherein the at least one exterior wall and the accumulator are a single integral unit.

11. The system of claim 1, further comprising a cover positioned atop the skirt, the cover being configured for preventing debris in the air from falling into the accumulator.

12. The system of claim 1, wherein the at least one exterior wall is parallel to the at least one interior wall.

* * * * *